Dec. 23, 1930.   W. H. NOURSE   1,786,081
SWIVEL BUTT HOOK
Filed May 7, 1928
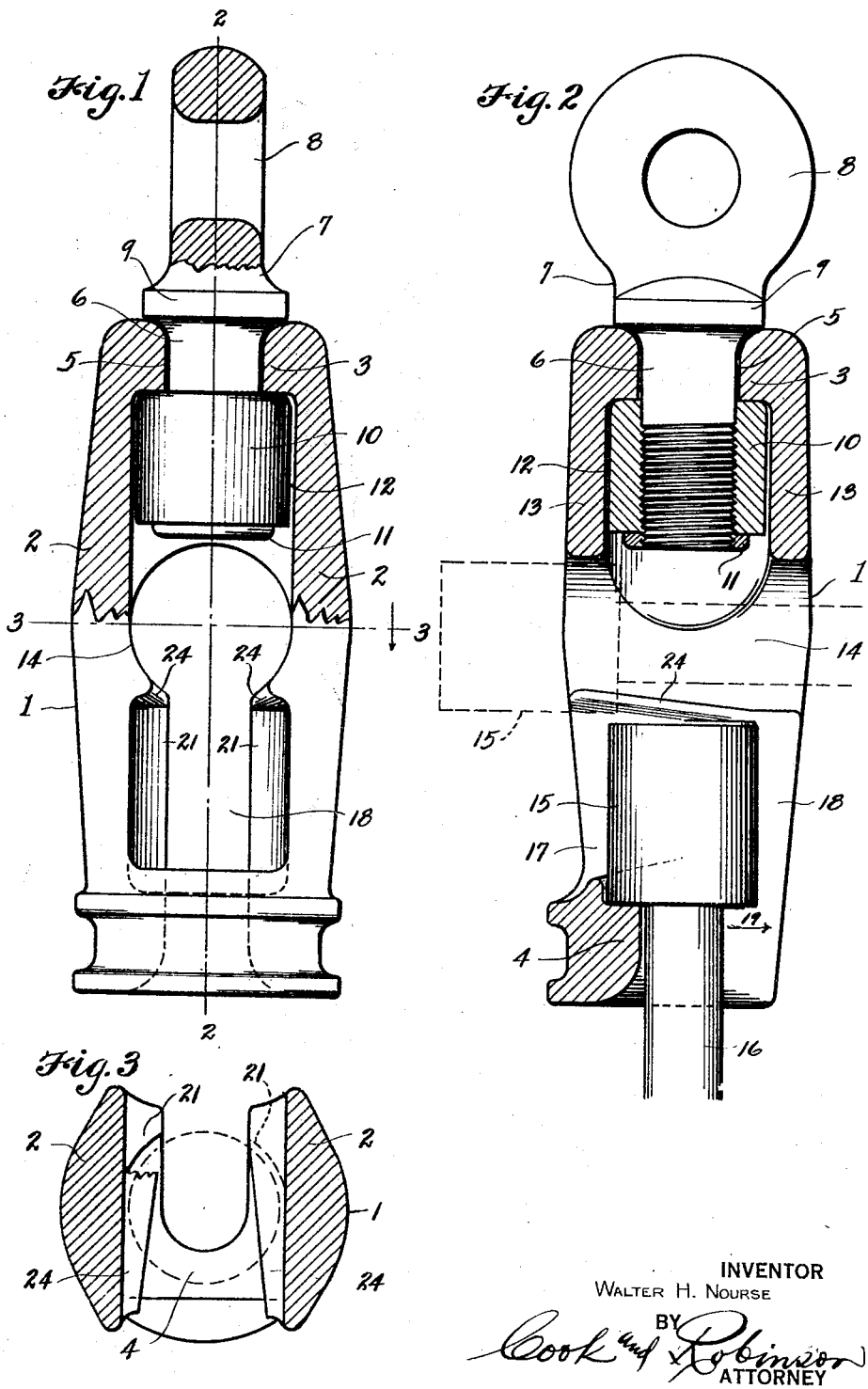
INVENTOR
WALTER H. NOURSE
BY
Cook and Robinson
ATTORNEY Patented Dec. 23, 1930

1,786,081

UNITED STATES PATENT OFFICE

WALTER H. NOURSE, OF PORTLAND, OREGON, ASSIGNOR TO ELECTRIC STEEL FOUNDRY CO., OF PORTLAND, OREGON, A CORPORATION OF OREGON

SWIVEL BUTT HOOK

Application filed May 7, 1928. Serial No. 275,774.

This invention relates to improvements in logging hooks, and more particularly to devices of that character known in the logging industry as butt or bull hooks, whereby the choker lines are connected with the butt line or haul-in cables.

It is the principal object of the present invention to provide certain features of construction in such hooks, whereby manipulation of the hook in attaching and releasing the choker lines thereto is made easier and quicker, whereby accidental disconnection is rendered less liable, and whereby twisting of the cables is overcome.

More specifically stated, the object of the present invention resides in equipping a butt hook of that type described and illustrated in United States Patent No. 16,413 (reissue) issued August 31, 1926, with a swivel of novel construction whereby a butt line connection may be made.

Other objects of the invention reside in the novel features of construction of the swivel and means whereby it is attached to the hook body so as to provide a secure connection that will, at no time, interfere with the attachment or disconnection of the choker line.

In accomplishing these objects of the invention, I have provided the improved details of construction, the preferred forms of which are illustrated in the accompanying drawings, wherein—

Figure 1 is an elevation of the hook, shown partly in section for better illustration.

Figure 2 is a longitudinal section of the same, taken substantially on the line 2—2 in Figure 1.

Figure 3 is a horizontal section on the line 3—3 in Figure 1.

The particular type of hook for which the present swivel construction is designed, although not confined to this type, consists of a hook body provided at one end with means for receiving and securing the swivel thereto and having a transverse opening through the central portion of the body through which the retaining ferrule secured at the end of a choker line may be projected; there being also a slot formed in the body from the transverse opening through the base end of the hook for passing the cable in order to permit seating the ferrule within the hook. It is recognized that there is nothing new in the hook itself outside of the swivel construction, and this differs from that construction shown in the above referred to patent in that it is a part independent of the hauling cable and also in that the swivel shank is secured against longitudinal movement within the hook opening and is thereby held against interfering with the insertion or removal of the choker line ferrule. It is in this particular form of swivel and the means for securing it within the hook that the invention resides.

Referring more in detail to the drawings—

The present device comprises the hook body 1; this being a casting or forging in the form of a link, with spaced opposite side walls 2—2 joined at opposite ends of the link by integral end walls 3 and 4. Formed in the end wall 3 coaxially of the hook body, is an opening 5 through which the shank 6 of a swivel 7 is rotatably fitted. The outer portion of the swivel is formed with an eye 8 for receiving the end of the haul-in cable to which the hook is to be attached, or some means or device whereby connection can be made with the cable, and there is an enlarged, encircling shoulder 9 formed between the shank and the eye and this abuts the outer face of the shank end wall 3. The inner end of the shank extends well through the wall 3 and, threaded onto its inner end, is an elongated nut 10, one end of which abuts the inner face of the wall 3 so as to secure the swivel to the link. This nut 10 also prevents any lengthwise movement of the shank but, at the same time, does not prevent free rotative action of the swivel. The nut 10 is locked in place against unthreading from the shank by a locking collar 11 that is threaded onto and then welded to the end of the shank which projects slightly beyond the end of the nut 10.

The nut 10 which retains the swivel is inclosed within a circular chamber 12 in the hook body between the opposite side walls 2—2 and webs 13—13 which extend between the side walls from the end wall 3.

Formed through the body 1 of the hook, about midway of its ends and at a right angle to the longitudinal axis of the body, is a circular opening 14 through which the retaining ferrule 15 at the end of a choker cable 16 may be projected endwise. This opening 14 communicates with an enlarged chamber 17 intermediate it and the end wall 4, into which the ferrule, after being projected through the body as indicated in dotted lines in Figure 2, and then drawn downwardly and inwardly, may be turned in the longitudinal direction of the body for seating its inner end against the end wall 4, as shown. To permit this seating of the ferrule, the hook body is provided at one side with a longitudinal slot 18 which extends from the opening 14 downwardly and through the base end wall 4. This slot is just sufficiently wide that the cable 16 may pass therethrough, for seating the ferrule, but is not of a width sufficient to permit unseating of the ferrule by lateral movement in the direction of the arrow 19 in Figure 2. The chamber 17, within which the ferrule of the choker cable is disposed after connection has been made, is entirely open at one side so as to permit easy movement of the ferrule into and from the hook, but it is restricted at the other side by the longitudinally extending shoulders 21—21 which define the opposite sides of the slot 18 and which engage the ferrule to prevent its lateral movement in that direction, while the termination of the slot 18 in the end wall 4 prevents its being unseated in the opposite direction by reason of the fact that the cable 16 engages against the end of this slot.

To prevent any accidental unseating of the ferrule when in working position, as shown in Figure 2, I have provided inwardly projecting ribs 24—24 formed in the inner faces of the walls 2—2 of the hook body and extending from the slot 18 to the opposite open side of the body.

In using the hook, the choker cable is attached by projecting the ferrule 15 endwise through the opening 14, then moving it downwardly and drawing it inwardly while swinging the cable 16 downwardly through the slot 18 so as to finally seat the inner end of the ferrule against the end wall 4 with its upper end disposed beneath the ribs 24. To detach the choker cable, first sufficient slack is required that the cable may be swung upwardly through the slot 18 while the ferrule is pushed laterally from the chamber and then drawn endwise through the opening 14 in just the reverse manner as it is inserted.

Referring again to the swivel, it is readily apparent that manipulation of the hook for connecting or disconnecting the choker line is made easier by virtue of this connection, since it permits rotative movement of the hook on the swivel without requiring twisting of the cable to which it is connected and, in this way, the transverse opening may be brought into proper position for easy application or removal of the retaining ferrule at the end of the choker line. It is also apparent that the shoulder 9 and nut 10 positively secure the swivel against longitudinal movement and there is no possibility of the swivel moving into a position at which it would interfere with removal or application of the choker ferrule to the hook. At the same time, the swivel is free to rotate when this is required.

The method of connecting the swivel to the hook has been found to be very satisfactory and substantial and is a relatively inexpensive construction. It is readily apparent that the length of the swivel shank may be varied as is required to give proper strength and hauling surface for the nut 10 and that there is no possibility of this locking nut being unthreaded since the retaining collar 11 is welded to the end of the shank and cannot be removed.

Having thus described my invention, what I claim as new therein and desire to secure by Letters Patent, is:

1. A device of the character described, comprising a hook body provided in one end wall with an opening, a swivel having a shank portion rotatably fitted in the opening, a collar formed about the shank to engage the end of the hook to limit inward movement of the shank, a nut threaded onto the inner end of the shank for engaging the hook wall to prevent outward movement of the shank and an eyelet formed on the outer end of the shank for connection with a hauling means.

2. In a hook provided with means at one end for connection with a choker cable, or the like, and provided in its other end with an opening, a swivel having a shank extended rotably through the opening, a nut threaded onto the inner end of the shank to prevent its displacement from the hook, a locking collar threaded onto the end of the shank against the end of the nut and welded to the shank, a collar formed about the shank for engaging the outer face of the hook to cooperate with the nut in preventing longitudinal shifting of the shank in the opening and an eyelet formed at the outer end of the shank for connection with a hauling means.

3. A hook of the character described, comprising a body portion provided at one end for connection with a choker cable, or the like, and provided in its opposite end with a coaxially located opening into a chamber, a swivel having a shank extended rotatably through the opening and into the chamber, a collar formed on the shank for engaging the outer surface of the hook to limit inward movement of the shank, a nut threaded onto the inner end of the shank and a locking collar welded on the end of the shank against the end of the nut and an eyelet formed on the outer end of the shank; said nut and inner end portion of the shank being confined wholly within the chamber.

Signed at Portland, Oregon, this 11th day of January, 1928.

WALTER H. NOURSE.